US012341164B2

(12) United States Patent
Li et al.

(10) Patent No.: US 12,341,164 B2
(45) Date of Patent: *Jun. 24, 2025

(54) ELECTRIC ENERGY STORAGE DEVICE, POWER TOOL SYSTEM AND CHARGING SYSTEM (71) Applicant: Greenworks (Jiangsu) Co., Ltd, Jiangsu (CN)

(72) Inventors: Baoan Li, Jiangsu (CN); Xi Li, Jiangsu (CN); Xinzhong Guo, Jiangsu (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,469

(22) Filed: Oct. 24, 2023

(65) Prior Publication Data

US 2024/0055673 A1 Feb. 15, 2024

Related U.S. Application Data (63) Continuation of application No. 17/111,533, filed on Dec. 4, 2020, now Pat. No. 11,837,702.

(30) Foreign Application Priority Data

Dec. 9, 2019 (CN) .......................... 201911247866.1

(51) Int. Cl.
H02J 7/00 (2006.01)
H01M 10/42 (2006.01)

(52) U.S. Cl.
CPC ..... *H01M 10/425* (2013.01); *H02J 7/007182* (2020.01); *H01M 2010/4278* (2013.01); *H01M 2220/30* (2013.01)

(58) Field of Classification Search
None
See application file for complete search history.

(56) References Cited

U.S. PATENT DOCUMENTS

2007/0019453 A1* 1/2007 Pierce .................. H01M 10/46
363/107
2014/0009857 A1* 1/2014 Suzuki ............... H01M 10/615
361/87

* cited by examiner

*Primary Examiner* — Arun C Williams (57) ABSTRACT

An electric energy storage device, the electric energy storage device configured to be detachably coupled with an electrical device, the electric energy storage device comprises a housing, N sets of battery units received in the housing, N being a composite number, each battery unit comprising at least one battery cell, a plurality of switches, each switch connected to the output end of two different battery units, a control unit electrically connected to the switches and configured to control the switches to switch on or off in order to connect the battery units in parallel or series, wherein the electric energy storage device can output at least three different voltages. The electric energy storage device can be used for different types of power tools with different voltage requirements.

19 Claims, 9 Drawing Sheets

ELECTRIC ENERGY STORAGE DEVICE, POWER TOOL SYSTEM AND CHARGING SYSTEM

CROSS-REFERENCE TO RELATED INVENTIONS

The present application is a Continuation Application of U.S. application Ser. No. 17/111,533 filed on Dec. 4, 2020, which claims the priority of Chinese Patent Application No. 201911247866.1, filed on Dec. 9, 2019, the disclosures of which are hereby incorporated by reference in their entirety.

TECHNICAL FIELD

The invention relates to an electric energy storage device, a power tool system and a charging system with the electric energy storage device, respectively.

BACKGROUND ART

Battery pack has been widely used in both domestic and industrial settings for its portability and removability. Electric power tools commonly used in homes and industries generally use a motor as a load, which consumes power supplied from a battery pack to perform driving force required for work.

The requirements of different types of power tools on voltage are often different, the battery pack with one voltage or two voltages cannot provide voltage for various power tools with different rated voltages. In view of the above, there is a need for an improved battery pack to solve the above problems.

SUMMARY OF INVENTION

The object of the present invention is to provide an electric energy storage device which can output at least three voltages so as to match with different types of power tools for supplying power.

In order to achieve the above object, the present invention provides an electric energy storage device configured to be detachably coupled with an electrical device, the electric energy storage device comprises a housing, N sets of battery units received in the housing, N being a composite number, each battery unit comprising at least one battery cell, a plurality of switches, each switch connected to the output end of two different battery units, a control unit electrically connected to the switches and configured to control the switches to switch on or off in order to connect the battery units in parallel or series, wherein the electric energy storage device can output at least three different voltages.

As a further improvement of the present invention, the control unit comprises a micro control unit and a driver connected with the micro control unit, the micro control unit sends a control order to the driver, and the switches are driven by the driver.

As a further improvement of the present invention, each battery unit has a same output voltage.

As a further improvement of the present invention, the number of the switches is 3(N−1).

As a further improvement of the present invention, the switches comprise a plurality of first switches connecting with positive output ends of a plurality of battery units, a plurality of second switches connecting with negative output ends of a plurality of battery units, and a plurality of third switches connecting the output ends with different polarity of a plurality of battery units.

As a further improvement of the present invention, when the micro control unit sends a control order to the driver to drive the first switch and the second switch to be completely switched on and the third switch to be completely switched off, the N sets of battery units are connected in parallel, and an output voltage of the electric energy storage device is equal to the output voltage of single battery unit.

As a further improvement of the present invention, when the micro control unit sends a control order to the driver to drive part of the first switches, a part of the second switches and a part of the third switches to be switched on, the N sets of battery units form a series-parallel combination, and the output voltage of the electric energy storage device is larger than the output voltage of single battery unit but smaller than a sum of the output voltages of the N sets of battery units.

As a further improvement of the present invention, when the N battery units form the series-parallel combination, the N sets of battery units may be combined in series then in parallel, or in series then in parallel.

As a further improvement of the present invention, when the micro control unit sends a control order to the driver to drive the first switch and the second switch to be completely switched off and the third switch to be completely switched on, the N sets of battery units are connected in series, and the output voltage of the electric energy storage device is equal to the sum of the output voltages of the N stets of battery units.

As a further improvement of the present invention, the first switches, the second switches and the third switches are all MOSFETs.

As a further improvement of the present invention, N is 4.

As a further improvement of the present invention, N is 6.

In order to achieve the above object, the present invention also provides a power tool system, which comprises an electric energy storage device configured to be detachably coupled with an electrical device, the electric energy storage device comprises a housing, N sets of battery units received in the housing, N being a composite number, each battery unit comprising at least one battery cell, a plurality of switches, each switch connected to the output end of two different battery units, a control unit electrically connected to the switches and configured to control the switches to switch on or off in order to connect the battery units in parallel or series, wherein the electric energy storage device can output at least three different voltages, a first power tool having a first rated voltage, a second power tool having a second rated voltage, and a third power tool having a third rated voltage, wherein the electric energy storage device outputs a first rated voltage when being matched with the first power tool, the electric energy storage device outputs a second rated voltage when being matched with the second power tool, and the electric energy storage device outputs a third rated voltage when being matched with the third power tool.

As a further improvement of the present invention, the housing of the electric energy storage device is provided with an output port, the output port is provided with a positive terminal and a negative terminal, a positive output end of the N sets battery units is connected with the positive terminal, and a negative output end of the N sets of battery unit is connected with the negative terminal.

In order to achieve the above object, the present invention further provides a charging system, which comprises an electric energy storage device configured to be detachably coupled with an electrical device, the electric energy storage device comprises a housing, N sets of battery units received in the housing, N being a composite number, each battery unit comprising at least one battery cell, a plurality of switches, each switch connected to the output end of two different battery units, a control unit electrically connected to the switches and configured to control the switches to switch on or off in order to connect the battery units in parallel or series, wherein the electric energy storage device can output at least three different voltages, and a charging device charging the electric energy storage device, wherein the N sets of battery unit are paralleled connected when being charged.

The beneficial effect of the present invention is that: the electric energy storage device of the present invention can output at least three voltages, so that the same electric energy storage device can be used for different types of electric tools with different voltage requirements.

DESCRIPTION OF EMBODIMENT

In order to make the objectives, technical solutions, and advantages of the present invention clearer, the following describes the present invention in detail with reference to accompanying drawings and specific embodiment.

Figure 1:
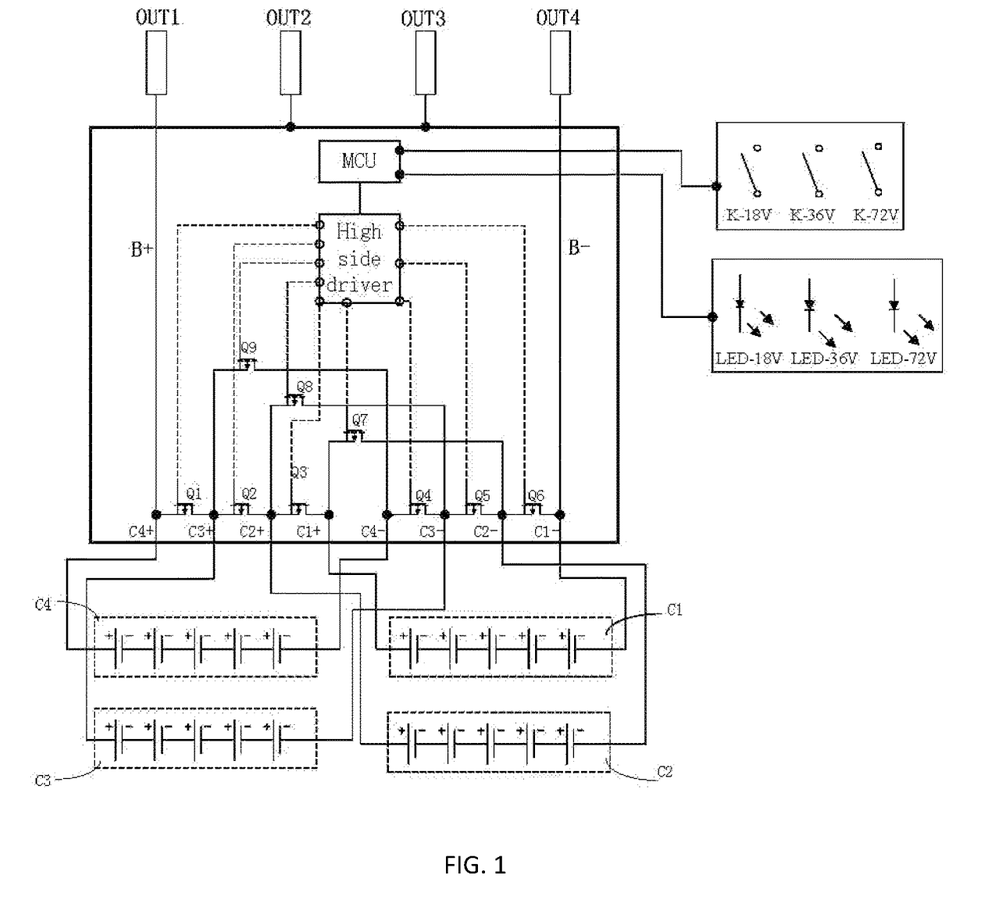
FIG. 1 is a circuit diagram of an electric energy storage device in first embodiment according to the present invention, wherein four battery units are applied.

Referring to FIG. 1, the present invention discloses an electric energy storage device, which includes a housing, a plurality of battery units accommodated in the housing, a plurality of switches, and a control unit for controlling the battery units through the plurality of switches, wherein there are N battery units, and N is a composite number (a composite number is a positive integer that can be formed by multiplying two smaller positive integers. Equivalently, it is a positive integer that has at least one divisor other than 1 and itself), each battery unit has a plurality of battery cell connected in series or in parallel, and each battery units has an equal output voltage.

The control unit comprises a MCU (Micro Control Unit) and a high side driver connected to the MCU, the switches are connected to and driven by the high side driver. The control unit is configured by following manner: the MCU sends a control signal to the high side driver, and the high side driver drives the corresponding switch to be switched on or switched off, so that the N battery units are connected in series and/or in parallel, and the electric energy storage device can output at least three voltages. Since the number of battery units is N, the number of the switches is 3(N−1).

By taking four battery units FIG. 1 for example, an operation of the electric energy storage device of the present invention will be described in detail below.

Four battery units are accommodated in the housing of the energy storage device. The four battery units are respectively a first battery unit C1, a second battery unit C2, a third battery unit C3 and a fourth battery unit C4, each battery unit consists of five battery cells which are connected in series, and each battery cell outputs 3.6V voltage and thus an output voltage of each battery unit is 18V. The first battery unit C1 has a positive output $C1^+$, and a negative output terminal $C1^-$; the second battery unit C2 has a positive output $C2^+$, and a negative output terminal $C2^-$; the battery unit C3 has a positive output $C3^+$, a negative output terminal $C3^-$; and the battery unit C4 has a positive output $C4^+$, a negative output terminal $C4^-$.

The housing has an output port for matching with a power tool or a charging device, which is provided with a positive terminal OUT1, a negative terminal OUT4, a communication terminal OUT2 and a charging terminal OUT3 which are positioned between the positive terminal OUT1 and the negative terminal OUT4, the positive output end $C4^+$ of the battery unit C4 is connected with the positive terminal OUT1, and a negative output end $C1^-$ of the first battery unit C1 is connected with the negative terminal OUT4; the communication terminal OUT2 is used for mating with the power tool to receive signals sent by the power tool or send signals to the power tool; the charging terminal OUT3 is used for mating with the charging device so that the charging device charges the electric energy storage device.

The switches comprise a plurality of first switches each connecting with two positive outputs of each two adjacent battery units, a plurality of second switches each connecting with two negative outputs of each two adjacent battery units, and a plurality of third switches each connecting with two different outputs with different polarity of the different battery units. In this embodiment, the first switches include a switch Q1 connecting the positive output $C4^+$ of the battery unit C4 and the positive output $C3^+$ of the battery unit C3, a switch Q2 connecting the positive output $C3^+$ of the battery unit C3 and the positive output $C2^+$ of the second battery unit C2, and a switch Q3 connecting the positive output $C2^+$ of the second battery unit C2 and the positive output $C1^+$ of the first battery unit C1. The second switches include a switch Q4 connecting the negative output $C4^-$ of the battery unit C4 and the negative output $C3^-$ of the battery unit C3, a switch Q5 connecting the negative output $C3^-$ of the battery unit C4 and the negative output $C2^-$ of the second battery unit C2, and a switch Q6 connecting the negative output $C2^-$ of the second battery unit C2 and the negative output $C1^-$ of the first battery unit C1. The third switches include a switch Q7 connecting the positive output $C1^+$ of the first battery unit C1 and the negative output $C2^-$ of the second battery unit C2 a switch Q8 connecting the positive output $C2^+$ of the second battery unit C2 and the negative output $C3^-$ of the battery unit C3, and a switch Q9 connecting the positive output $C3^+$ of the battery unit C3 and the negative output $C4^-$ of the battery unit C4. The positive output $C4^+$ of the battery unit C4 is connected to the positive terminal OUT1, and the negative output $C1^-$ of the first battery unit C1 is connected to the negative terminal OUT 4.

Figure 2:
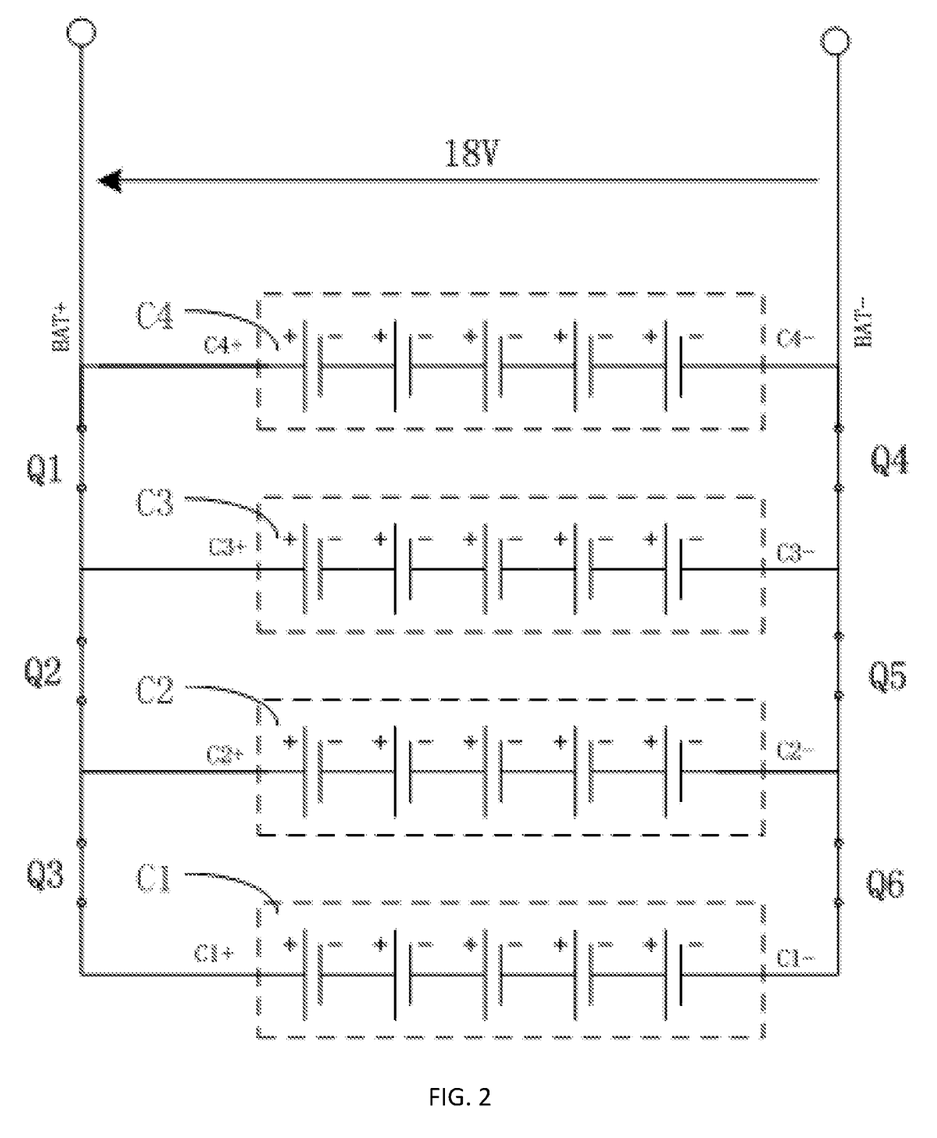
FIG. 2 is a circuit diagram of the four battery units connected in parallel with each other.

Referring to FIG. 1 and FIG. 2, when the electric energy storage device is matched with a 18V power tool, the MCU receives a signal from the power tool, the signal represents some characteristics of the power tool, such as a rated voltage of the 18V power tool, the MCU sends a control order to the high side driver, the high side driver drives the first switches (Q1, Q2 and Q3) and the second switches (Q4, Q5 and Q6) to be completely switched on, all the third switches (Q7, Q8 and Q9) are switched off, at the moment, so the four battery units (C1, C2, C3 and C4) are connected in parallel, and an output voltage of the electric energy storage device is equal to the output voltage of single battery unit, that is a first voltage 18V.

Figure 3:
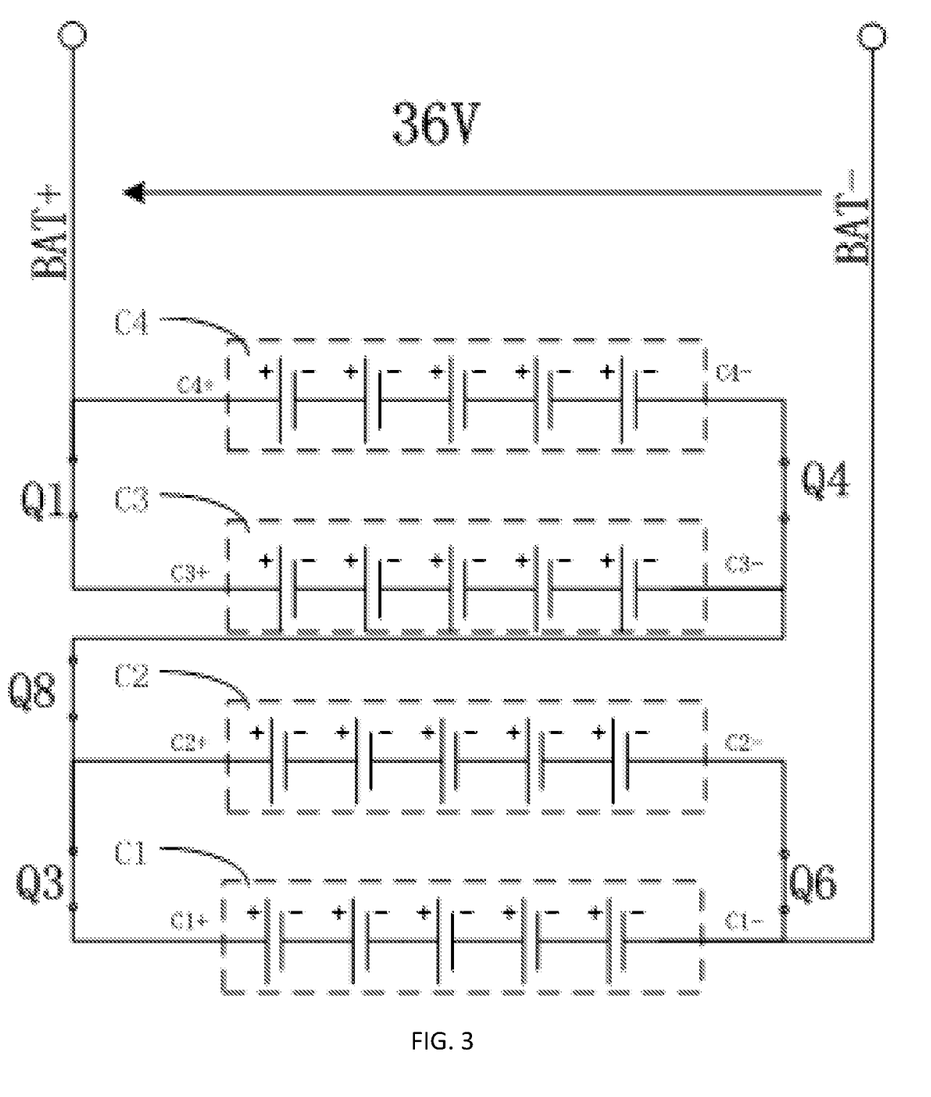
FIG. 3 is a circuit diagram of the four battery units connected in parallel-series combination.

Referring to FIG. 1 and FIG. 3, when the electric energy storage device is matched with a 36V power tool, the MCU receives a feedback signal from the power tool, such as a signal indicates the rated working voltage of the 36V power tool, the MCU sends a control order to the high side driver, the high side driver drives the first switches Q1 and Q3, the second switches Q4 and Q6, and the third switches Q8 to be switched on, the MCU also drives the first switches Q2, the second switches Q5 and the third switches Q7 and Q9 to be switched off. In this configuration, the battery units C1 and C2 are parallel connected to form a first battery group and the battery units C3 and C4 are paralleled connected to form a second battery group. The first battery group and the second battery group are series connected to each other. So the four battery units (C1, C2, C3 and C4) form a parallel-series combination, and the output voltage of the electric energy storage device is larger than the output voltage (18V) of single battery unit, but smaller than a sum of the output voltage of the four battery units (72V), that is a second voltage 36V.

It should be noted that in some embodiments of the present invention, the first battery unit C1 and the second battery unit C2 are series connected to form the first battery group, the third battery unit C3 and the fourth battery unit C4 are series connected to form the second battery group. The first battery group and the second battery group are paralleled connected to each other. The four battery units (C1, C2, C3 and C4) form a series-parallel combination. The output voltage of the energy storage device is 36V.

Figure 4:
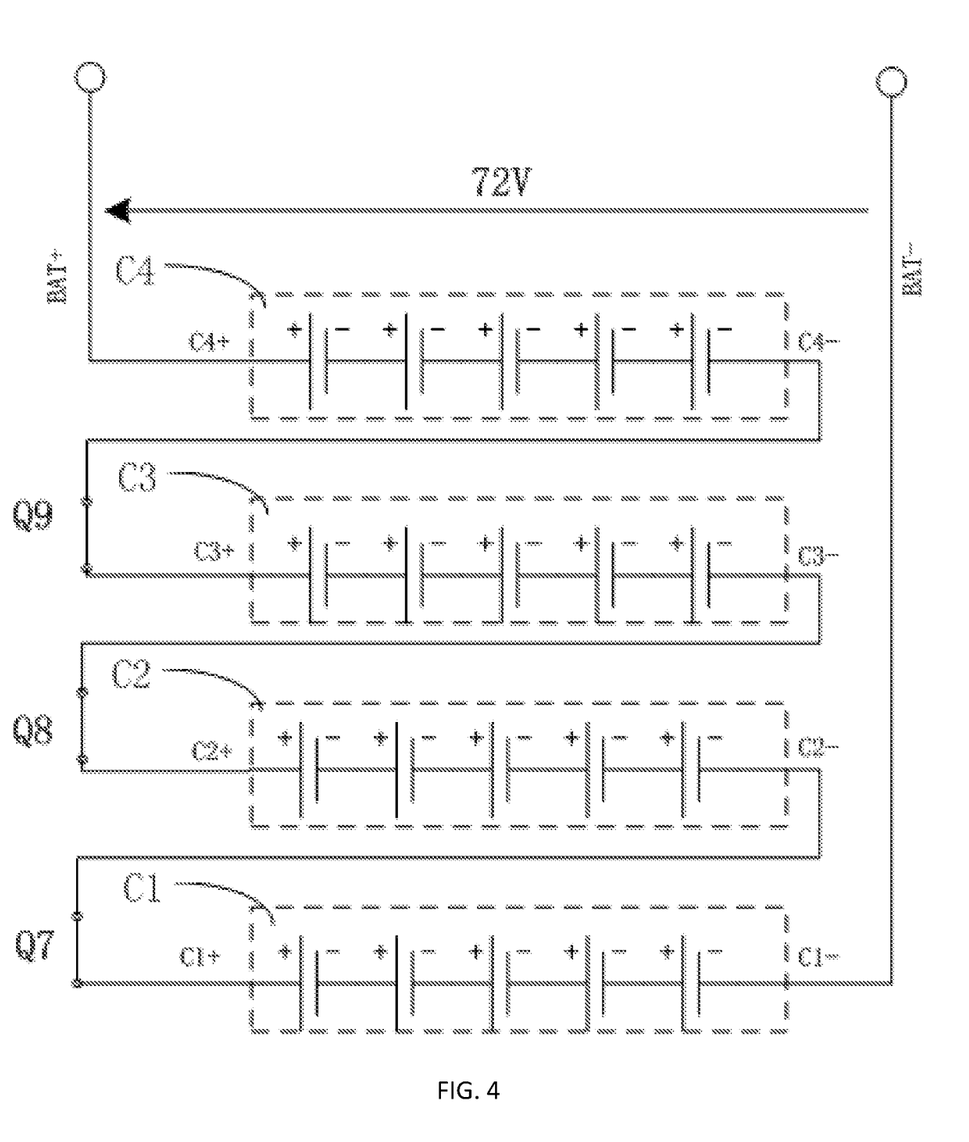
FIG. 4 is a circuit diagram of the four battery units connected in series with each other.

Referring to FIG. 1 and FIG. 4, when the electric energy storage device is matched with a 72V power tool, the MCU receives a signal from the power tool, such as a signal indicates the rated working voltage of the 72V power tool, the MCU sends a control order to the high side driver, the high side driver drives the first switches Q1, Q2 and Q3, the second switches Q4, Q5 and Q6 to be completely switched off, and all the third switches Q7, Q8 and Q9 to be switched on, so the four battery units C1, C2, C3 and C4 are connected in series, and the output voltage of the electric energy storage device is equal to the sum of the output voltages of the four battery units, that is a third voltage 72V.

In present invention, the first switches (Q1, Q2, Q3), the second switches (Q4, Q5, Q6), and the third switches (Q7, Q8, Q9) are MOSFETs (Metal-Oxide-Semiconductor Field-Effect Transistor). The present invention is not limited thereto. In some other embodiments of the present invention, the switches can be relays, transistors or other components which can implement the function of the invention.

In the embodiments discussed above, the output voltage of the energy storage device is determined by the signal sent by the power tools and received by MCU when the energy storage device is matched with the power tools. In some embodiments of the present invention, when the energy storage device does not match with any power tool, the energy storage device can be controlled by outer actuation.

As shown in FIG. 1, the control unit further comprises a switch K-18V, a switch K-36V, a switch K-72V and a plurality of LED indicator lights connected with the MCU, wherein the LED indicator lights comprise an LED-18V corresponding to the switch K-18V, an LED-36V corresponding to the switch K-36V and an LED-72V corresponding to the switch K-72V. The switches K-18V, K-36V, K-72V and the LED indicator lights LED-18V, LED-36V, LED-72V are all arranged on the housing of the energy storage device. The LED-18V, LED-36V and the LED-72V will be lighted when the corresponding switches (K-18V, K-36V, K-72V) are actuated.

When the MCU detects the switch K-18V is pressed by operator, a control order was sent to the high side driver, the high side driver drives the first switches (Q1, Q2 and Q3) and the second switches (Q4, Q5 and Q6) to be all turned on, the third switches (Q7, Q8 and Q9) are all turned off, the four battery units (C1, C2, C3 and C4) are connected in parallel, the output voltage of the electric energy storage device is equal to the output voltage of single battery unit, that is the first voltage 18V, and then the LED-18V is lighted.

Similarly, when the MCU detects the switch K-36V is pressed by operator, the MCU controls the electric energy storage device to output 36V voltage, and the LED-36V is lighted; when the switch K-72V is pressed, the MCU controls the electric energy storage device to output 72V voltage, and the LED-72V is lighted at the moment.

Figure 5:
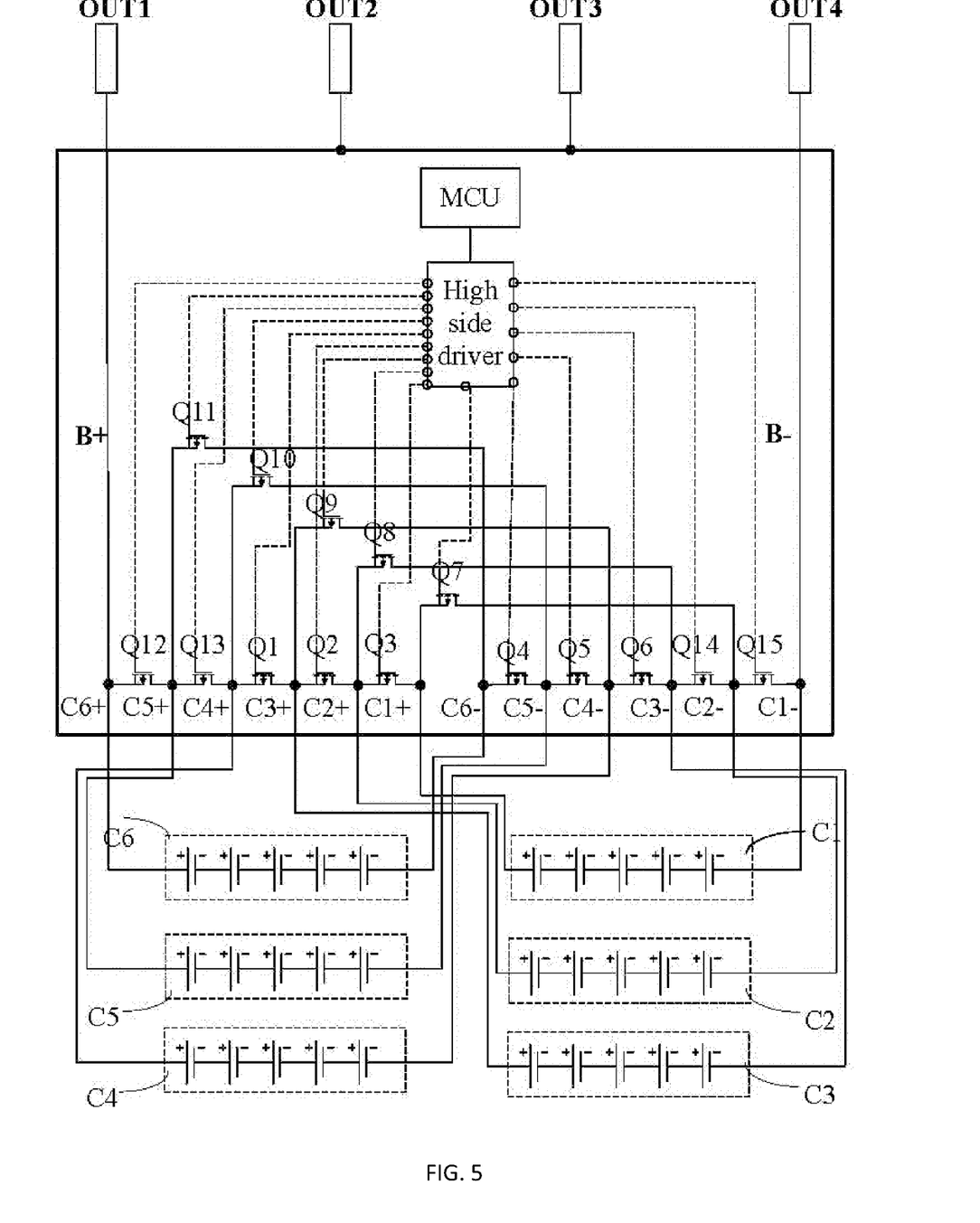
FIG. 5 is a circuit diagram of an electric energy storage device in second embodiment according to the present invention, wherein six battery units are applied.

Referring to FIG. 5 in combination with FIG. 1, when the electric energy storage device of the present invention has six battery units (C1, C2, C3, C4, C5, and C6), the setting manner of the switches, the controlling manner of the MCU, and the driving manner of the high side driver in FIG. 5 are the same as those in FIG. 1, except that: the number of the battery units (N) in FIG. 5 is 6, the number of corresponding switches is 15 (3N−3), and the output voltage of single battery unit is defined as n (specifically, 18V), then the electric energy storage device can output four voltages, which are n (18V), 2n (36V), 3n (54V), and 6n (108V).

Figure 6:
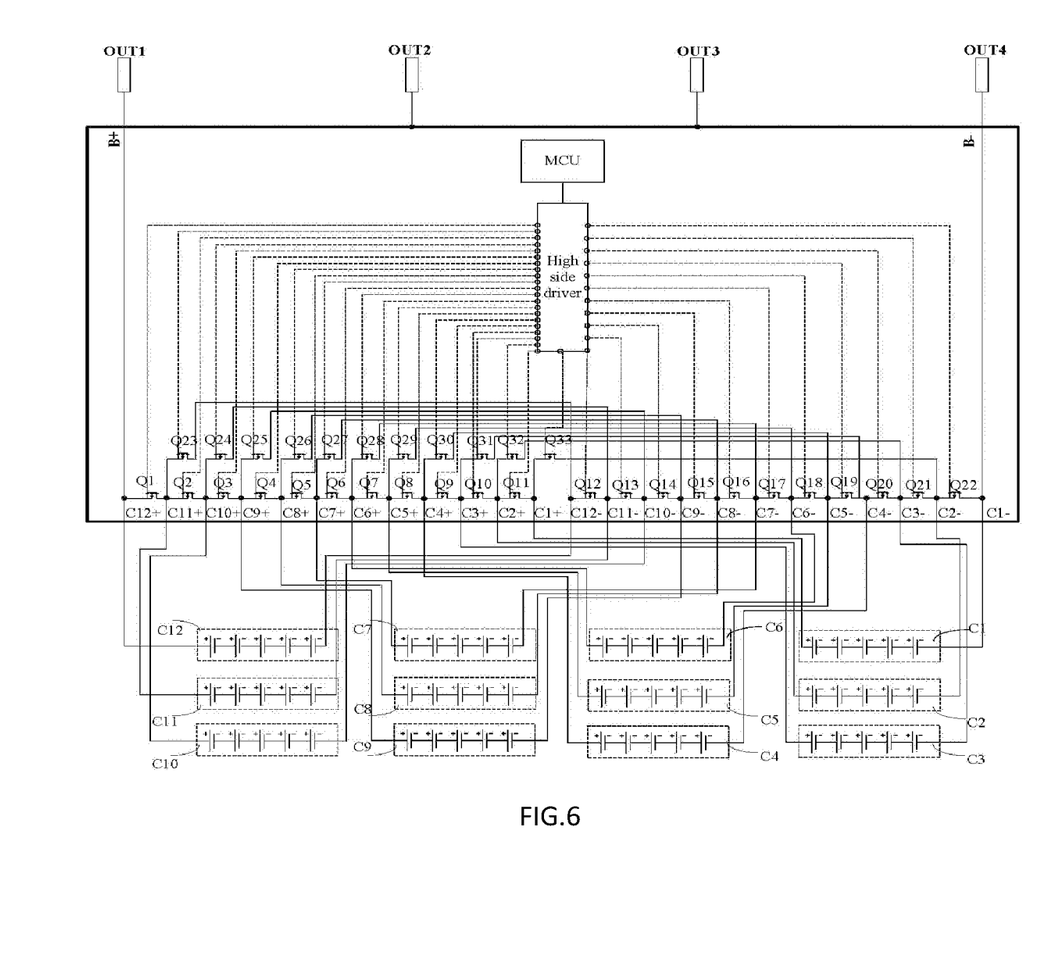
FIG. 6 is a circuit diagram of an electric energy storage device in third embodiment according to the present invention, wherein twelve battery units are applied.

Referring to FIG. 6 in combination with FIG. 1, when the electric energy storage device of the present invention has twelve battery units (C1, C2, C3, C4, C5, C6, C7, C8, C9, C10, C11, and C12), the setting manner of the switches, the control manner of the MCU, and the driving manner of the high side driver in FIG. 6 are the same as those in FIG. 1, except that: the number of the battery units (N) in FIG. 6 is 12, the number of the corresponding switches (3N−3) is 33, and the output voltage of single battery unit is defined as n (specifically, 18V), then the electric energy storage device can output six voltages, which are n (18V), 2n (36V), 3n (54V), 4n (72V), 6n (108V), and 12n (216V).

Figure 7:
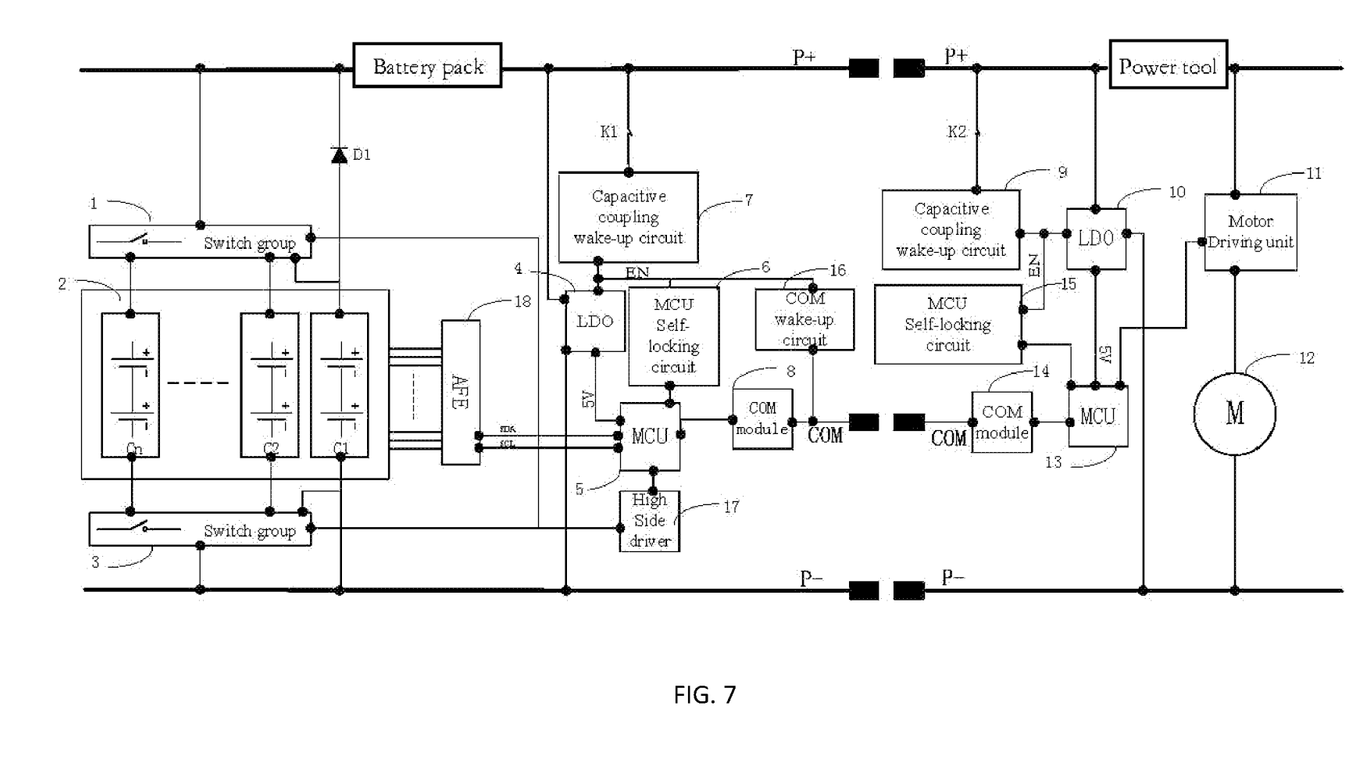
FIG. 7 is a working principle diagram of a power tool activated by the electric energy storage device of the present invention.
Figure 8:
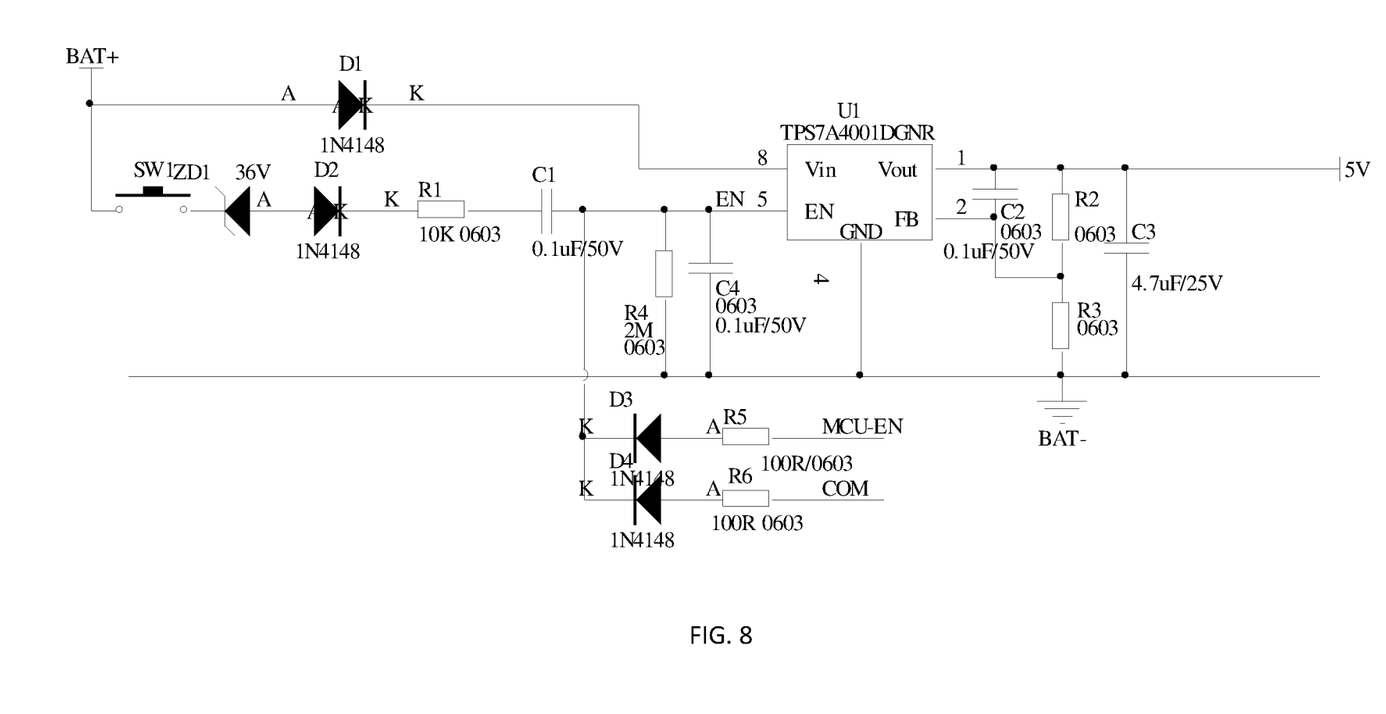
FIG. 8 is a circuit diagram of a wake-up circuit and a self-locking circuit located at a periphery of LDO shown in FIG. 7.
Figure 9:
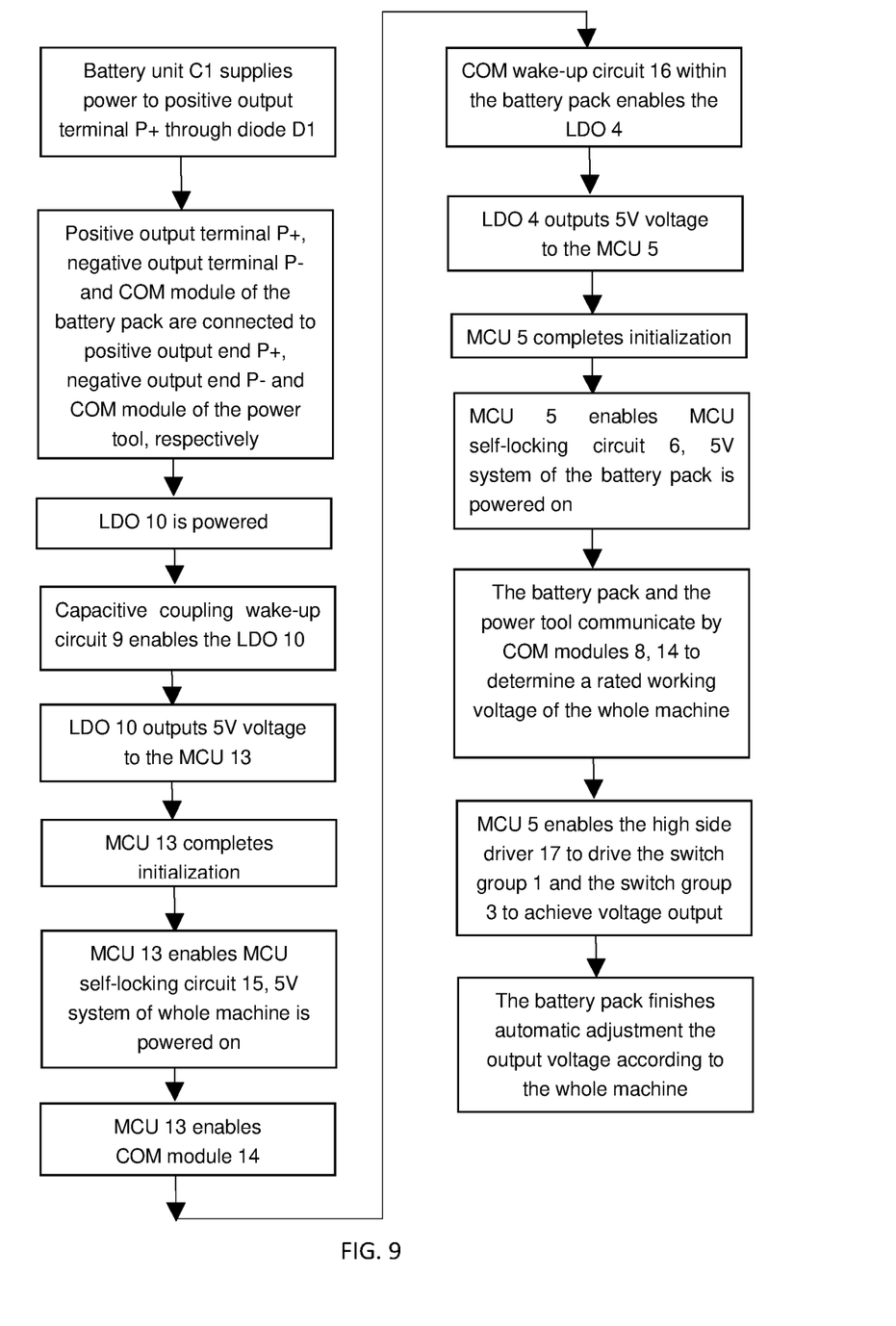
FIG. 9 is a working flow chart of the electric energy storage device mating with the power tool according to the present invention.

Referring to FIG. 7 to FIG. 9, taking the electric energy storage device as a battery pack as an example, the battery pack has a positive output terminal P+ and a negative output terminal P−, one end of a switch group 1 is connected with the positive output terminal P+, and the other end of the switch group 1 is connected with a positive of a battery unit 2. One end of a switch group 3 is connected with a negative of the battery unit 2, and the other end of the switch group 3 is connected with the negative output terminal P−. A positive output end of a first battery unit C1 is connected with the positive output terminal P+ through a diode D1, a negative output end of the first battery unit C1 is connected with the negative output terminal P− directly. The MCU 5 is connected with a LDO (low dropout regulator) 4, a MCU self-locking circuit 6, a COM module (communication module) 8 and the high side driver 17, respectively, and is also connected with the battery unit 2 through an AFE (analog front end) 18. LDO 4 is also connected with the positive output terminal P+ and the negative output terminal P− so that the battery pack supplies power to the LDO 4.

One end of a capacitor coupling wake-up circuit 7 is connected with the positive output terminal P+ by a switch K1, the other end of the capacitor coupling wake-up circuit 7 is connected to the LDO 4, the MCU self-locking circuit 6 and a COM (communication) wake-up circuit 16, respectively, and the other end of the COM wake-up circuit 16 is connected with the COM module 8. The high side driver 17 is respectively connected with the switch group 1 and the switch group 3 to drive corresponding switches to be switched on or switched off.

The power tool also has a positive output end P+ and a negative output end P−, one end of a motor 12 is connected with negative output end P−, the other end of the motor 12 is connected with a motor driving unit 11, and the other end of the motor driving unit 11 is connected with the positive output end P+, the MCU 13 is connected with a low dropout regulator (LDO) 10, a MCU self-locking circuit 15, a COM module 14 and a motor driving unit 11, respectively. LDO10 is also connected with the positive output end P+ and the negative output end P−. One end of a capacitor coupling wake-up circuit 9 is connected with the positive output end P+ by a switch K2, the other end of the capacitor coupling wake-up circuit 9 is connected with the LDO 10 and the MCU self-locking circuit 15, respectively. The COM module 14 is used for being matched with the COM module 8 of the battery pack, and the positive output end P+ of the power tool mates with the positive output terminal P+ of the battery pack, the negative output end P of the power tool mates with the negative output terminal P− of the battery pack, thereby realizing the electrical connection of the battery pack and the power tool.

FIG. 8 is a specific circuit diagram of the wake-up circuit and the self-locking circuit located at the periphery of the LDO 4/10 in FIG. 7. From this figure it can be seen that: the LDO is a voltage regulator U1 with model number TPS7A4001DGNR, and the voltage regulator U1 has an input end (Vin), an output end (Vout), an enable end (EN), a FB end and a ground end (GND). The input end (Vin) is connected to a battery anode (BAT+) by diode D1, the output end (Vout) is connected with a 5V power supply. The enable end EN is connected to the battery anode (BAT+) through a capacitor C1 (0.1 uF/50V), a resistor R1 (10K), a diode D2, a voltage stabilizing diode ZD1 (36V), and a switch SW1, and is also grounded through a capacitor C4 (0.1 uF/50V) and a resistor R4 (2M), respectively. The FB end is connected to the 5V power supply through a resistor R2 and to the ground end (GND) (i.e., being grounded) through a resistor R3. A capacitor C2 (0.1 uF/50V) is connected between the output end (Vout) and the FB end, and the output end (Vout) is grounded through a capacitor C3 (4.7 uF/25V).

The MCU is connected with the EN end through a resistor R5 (100R) and a diode D3, and the COM module is connected with the EN end through a resistor R6 (100R) and a diode D4, so that after the MCU enables the COM module, the voltage stabilizer U1 (namely LDO) is enabled together to activate and match between the battery pack and the whole power tool.

As shown in FIG. 9, when the battery pack is matched with the electric tool, the positive output terminal P+, the negative output terminal P− and the COM terminal of the battery pack connect with the positive output end P+, the negative output end P− and the COM end of the power tool, respectively. Firstly, the first battery unit C1 supplies power to positive output terminal P+ of the battery pack through the diode D1, the LDO 10 of the power tool is powered; then, the capacitor coupling wake-up circuit 9 of the power tool enables the LDO 10 of the power tool, the LDO 10 outputs 5V to the MCU 13 of the power tool, the MCU 13 of the power tool completes initialization, the MCU 13 enables the MCU self-locking circuit 15. At this time, a 5V system of whole machine is powered on, and the MCU 13 enables the COM module 14 of the power tool. Then, the COM wake-up circuit 16 within the battery pack enables the LDO 4 of the battery pack, the LDO 4 outputs 5V voltage to the MCU 5 of the battery pack, and the MCU 5 completes initialization, the MCU 5 enables the MCU self-locking circuit 6, at this time, a 5V system of the battery pack is powered on, and the battery pack and the power tool communicate through the COM modules 8, 14 to determine a rated working voltage of the power tool; finally, the MCU 5 of the battery pack enables the high side driver 17 to drive the switch group 1 and the switch group 3 to be turned on or off to output targeted voltage.

In short, after the battery pack is matched with the power tool, the power tool is awakened to generate a signal being sent back to the battery pack, the battery pack identifies the working voltage of the power tool and automatically switches to the corresponding voltage state, and then the power tool can work.

With the above description, the electric energy storage device of the present invention can be matched with not only the power tool but also the charging device, and when being matched with the power tool, the electric energy storage device can be matched with at least three power tools having different working voltages; when the electric energy storage device is matched with the charging device, the battery units within the electric energy storage device (such as a battery pack) can be in states of in parallel or in series, or in parallel and then in series, or in series and then in parallel, so that the electric energy storage device can be charged by at least three charging devices with different charging voltages, and the application range of the electric energy storage device is wider.

In summary, the electric energy storage device of the present invention can output at least three voltages, so that the electric energy storage device can be used for different types of power tools or charging devices with different voltage/current requirements, and at the same time, the electric energy storage device can communicate with the power tools/charging devices to automatically adjust the internal circuit configuration thereof according to the types of the power tools/charging devices.

Although the present invention has been described in detail with reference to the preferred embodiments, it will be understood by those skilled in the art that various changes may be made and equivalents may be substituted for elements thereof without departing from the spirit and scope of the present invention.

What is claimed is:

1. An electric energy storage device comprising:
   N sets of battery units;
   a plurality of switches, each switch connected to the output end of two different battery units;
   a control unit electrically connected to the switches and the N sets of battery units, and
   for receiving a feedback signal from a first power tool, controlling the operation of the switches in accordance with the feedback signal to change the connection of N sets of battery units so as to output a first rated voltage to the first power tool, or for receiving a feedback signal from a second power tool, controlling the operation of the switches in accordance with the feedback signal to change the connection of the N sets of battery units so as to output a second rated voltage to the second power tool, or for receiving a feedback signal from a third power tool, controlling the operation of the switches in accordance with the feedback signal to change the connection of the N sets of battery units so as to output a third rated voltage to the third power tool, wherein the first rated voltage, the second rated voltage, and the third rated voltage are each different.

2. The electric energy storage device according to claim 1, wherein the control unit comprises:

a micro control unit for receiving the feedback signal and sending a control order based on the feedback signal; and a high side drive unit connected to the micro control unit and the switches to drive the switches based on the control order received.

3. The electric energy storage device according to claim 2, wherein the switches comprise a plurality of first switches connecting with positive output ends of a plurality of battery units, a plurality of second switches connecting with negative output ends of a plurality of battery units, and a plurality of third switches connecting the output ends with different polarity of a plurality of battery units.

4. The electric energy storage device according to claim 3, wherein when the high side drive unit drives the first switches and the second switches to be completely switched on and the third switches to be completely switched off, the N sets of battery units are connected in parallel with each other, and the electric energy storage device outputs the first rated voltage.

5. The electric energy storage device according to claim 3, wherein when high side drive unit drives a part of the first switches, a part of the second switch and a part of the third switches to be switched on, the N sets of battery units form a series-parallel combination, and the electric energy storage device outputs the second rated voltage.

6. The electric energy storage device according to claim 3, wherein when the high side drive unit drives the first switches and the second switches to be completely switched off and the third switches to be completely switched on, the N sets of battery units are connected in series with each other, and the electric energy storage device outputs the third rated voltage.

7. The electric energy storage device according to claim 3, wherein the first switches, the second switches and the third switches are all MOSFETs.

8. The electric energy storage device according to claim 1, wherein each battery unit has a same output voltage.

9. The electric energy storage device according to claim 1, wherein the number of the switches is 3(N−1).

10. The electric energy storage device according to claim 1, further comprises a positive terminal OUT1, a communication terminal OUT2, a charging terminal OUT3, and a negative terminal OUT4.

11. A power tool system comprising:
a first power tool having a first rated voltage;
a second power tool having a second rated voltage; and
a third power tool having a third rated voltage;
an electric energy storage device comprises:
N sets of battery units;

a plurality of terminals comprises a first terminal, a second terminal, a third terminal and a fourth terminal;

when the first terminal, the second terminal, and the fourth terminal of the electric energy storage device are connected to the first power tool, the N sets of battery units are connected in parallel and output the first rated voltage to the first power tool;

when the first terminal, the second terminal, and the fourth terminal of the electric energy storage device are connected to the second power tool, the N sets of battery units are connected in series-parallel and output the second rated voltage to the second power tool;

when the first terminal, the second terminal, and the fourth terminal of the electric energy storage device are connected to the third power tool, the N sets of battery units are connected in series and output the third rated voltage to the third power tool.

12. The power tool system according to claim 11, wherein the first terminal is positive terminal OUT1, the second terminal is communication terminal OUT2, the third terminal is charging terminal OUT3, and the fourth terminal is negative terminal OUT4.

13. The power tool system according to claim 11, wherein the electric energy storage device further comprises:

a plurality of switches, each switch connected to the output end of two different battery units;

a control unit electrically connected to the switches and the N sets of battery units, and controlling the switches to switch on or off, causing the N sets of battery units to be connected in series and/or in parallel.

14. The power tool system according to claim 13, wherein the control unit comprises:

a micro control unit for receiving the feedback signal and sending a control order based on the feedback signal; and a high side drive unit connected to the micro control unit and the switches to drive the switches based on the control order received.

15. The power tool system according to claim 14, wherein the switches comprise a plurality of first switches connecting with positive output ends of a plurality of battery units, a plurality of second switches connecting with negative output ends of a plurality of battery units, and a plurality of third switches connecting the output ends with different polarity of a plurality of battery units.

16. The power tool system according to claim 14, wherein when the high side drive unit drives the first switches and the second switches to be completely switched on and the third switches to be completely switched off, the N sets of battery units are connected in parallel with each other, and the electric energy storage device outputs the first rated voltage.

17. The power tool system according to claim 14, wherein when high side drive unit drives a part of the first switches, a part of the second switch and a part of the third switches to be switched on, the N sets of battery units form a series-parallel combination, and the electric energy storage device outputs the second rated voltage.

18. The power tool system according to claim 14, wherein when the high side drive unit drives the first switches and the second switches to be completely switched off and the third switches to be completely switched on, the N sets of battery units are connected in series with each other, and the electric energy storage device outputs the third rated voltage.

19. The power tool system according to claim 13, wherein the number of the switches is 3(N−1).

* * * * *